Oct. 13, 1942.  S. CLAUSEN  2,298,279
MACHINE FOR MANUFACTURING SCRAP BUNCHES
Filed Nov. 12, 1938  4 Sheets-Sheet 1

INVENTOR
SIGURD CLAUSEN
BY George S. Hastings
ATTORNEY

Oct. 13, 1942.  S. CLAUSEN  2,298,279
MACHINE FOR MANUFACTURING SCRAP BUNCHES
Filed Nov. 12, 1938  4 Sheets-Sheet 2
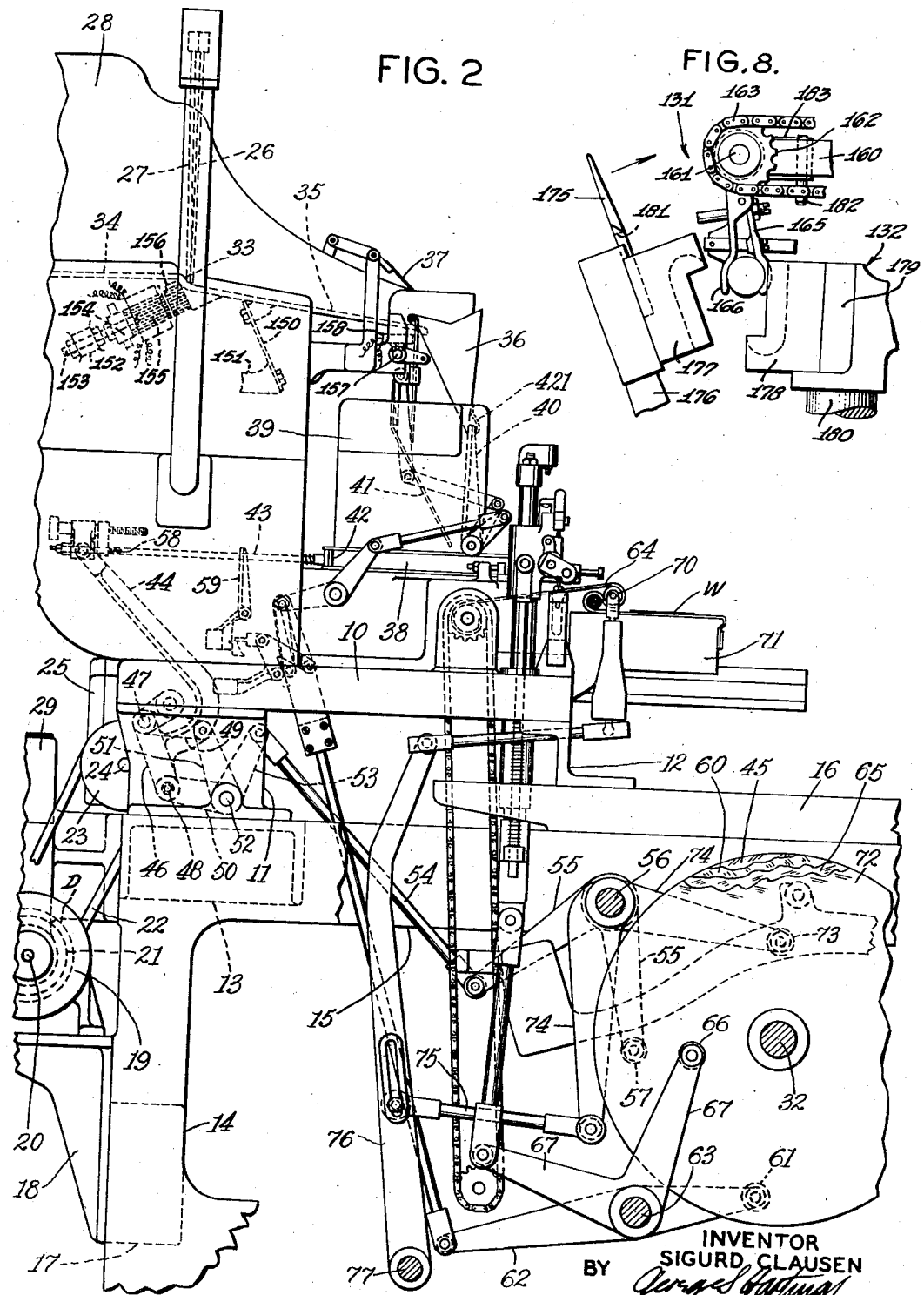
INVENTOR
SIGURD CLAUSEN
BY
ATTORNEY Oct. 13, 1942.                S. CLAUSEN                 2,298,279
            MACHINE FOR MANUFACTURING SCRAP BUNCHES
                    Filed Nov. 12, 1938          4 Sheets-Sheet 3
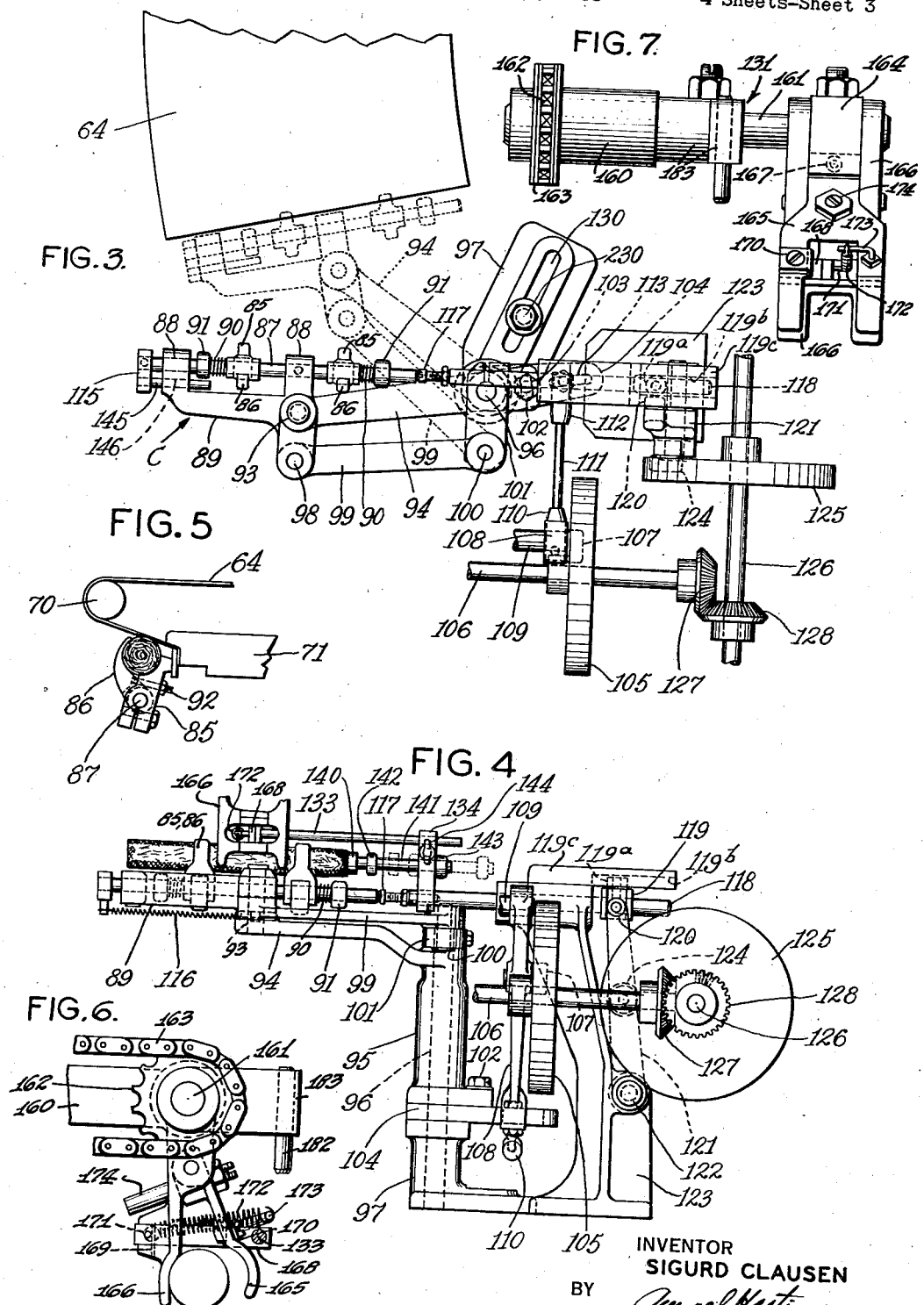
INVENTOR
SIGURD CLAUSEN
BY
ATTORNEY

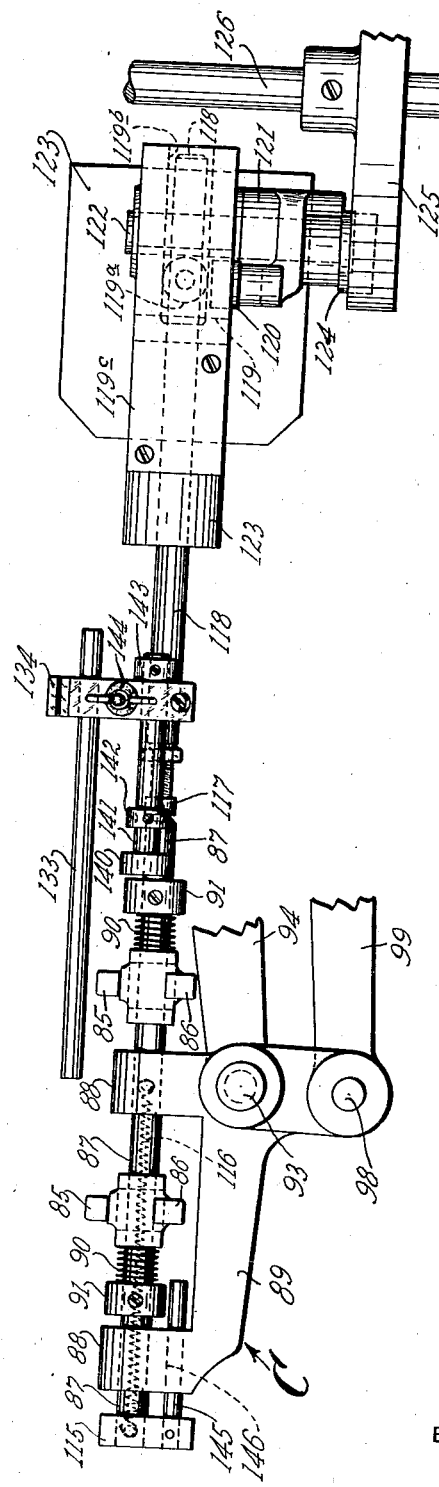

Patented Oct. 13, 1942

2,298,279

UNITED STATES PATENT OFFICE 2,298,279

MACHINE FOR MANUFACTURING SCRAP BUNCHES

Sigurd Clausen, Brooklyn, N. Y., assignor to International Cigar Machinery Company, a corporation of New Jersey Application November 12, 1938, Serial No. 240,087

17 Claims. (Cl. 131—32)

This invention relates to cigar machines and more particularly to improvements in mechanism for making scrap or short filler cigar bunches.

Usually in making short filler cigar bunches, it is customary at one stage of the process to place the bunches in molds for a period of time during which each bunch is shaped and molded to its ultimate desired size ready for wrapping. According to my invention, however, it is an object to dispense with this molding operation and, therefore, I have provided mechanism which will form satisfactory bunches without any prolonged molding and shaping operation, and one in which short filler bunches are rolled, transferred from the rolling apron into a suitable crimping and trimming device where the ends are rapidly crimped, shaped and cut to size, all in one cycle of the machine operation. The shaped bunch is then transferred directly to the rolling station for application of the wrapper.

It is also an object of this invention to make short filler cigars by employing principles heretofore only thought capable of use in forming long filler cigars. For this purpose, I have eliminated from the machine of my invention, the locating and bunch softening mechanisms generally employed in the production of long filler cigars. This is due to the fact that in the manufacture of soft filler cigar bunches because of the flowing quality of short filler tobacco, locators contacting the ends of bunches might have the tendency to form soft shoulders adjacent the bunch ends which would be carried over into a finished cigar and cause it to be rejected. Also if a short filler bunch were to be placed in a softening device and rolled back and forth for a given period of time, the tobacco therein would flow out of the ends and the cigar thus formed could not pass inspection.

The invention also consists in the provision of novel conveyor mechanism for transporting newly rolled bunches from the bunch rolling apron to bunch crimping and trimming devices, and further includes, means for axially shifting a bunch being transferred in order to position it properly in the crimping and trimming means. It is in this manner that successive bunches are uniformly positioned in the crimping and trimming jaws and are reduced to the predetermined desired size and shape during each cycle of the machine, and hence very satisfactory uniformity in bunches can be obtained without the necessity of using elaborate shaping turrets or molding units formerly utilized in the manufacture of soft filler cigars. Hence, it is a further object of my invention to provide simplified means for crimping and trimming short filler cigars, and mechanism which is less complicated in construction and much less expensive to make and maintain in repair.

Another object of the invention is to form binders on a binder cutting die, transfer these binders to a bunch rolling device, and convey bunches from the rolling device to the crimping and trimming mechanism where each bunch is acted upon to reduce it to proper shape and size. The provision of improved bunch transferring mechanism simplifies the problem of locating bunches to be transferred to the crimping jaws and trimmers, and also makes it possible for an operator to devote practically all of her time to laying binder leaves on the cutting die, since according to my invention it is unnecessary for her to lift bunches from the rolling device and manually insert them in the molds of a turret or like molding unit. It also makes it possible to save considerable binder material by a more economical use thereof, in that binder leaves can be accurately served and more time is available for efficiently patching binders.

It is an added object of the invention to provide improved mechanism for feeding short filler tobacco which includes a vibratory hopper for feeding this type of tobacco to a charge forming and bunch rolling device, and for associating therewith improved means for forming short filler cigar bunches. Although a vibrating hopper may be employed satisfactorily for feeding practically all types of commonly used short filler tobacco, I have found that it can be used with great success in advancing in a uniform stream to a charge measuring device, larger short filler tobacco than has heretofore been possible. I have found that the use of this type of feeding device makes it possible to utilize cigar forming mechanism which formerly was considered to be capable of using only long filler tobacco and not able to handle and produce satisfactory short filler cigars. The successful handling and conversion of short filler tobacco into bunches, with the elimination of the usual molding operation for a prolonged period of time is also due in part to the mechanism which cooperates with the improved feed in distributing the particles of tobacco with substantially all of their lengths extending in one general direction. Under these conditions the several pieces of large short filler required for a bunch are easily handled in my improved bunch forming and cigar wrapping mechanism, the filler assumes cigar form with less manipulation than in the case of small short filler, and hence contributes much to the successful operation of the machine.

It is also an object of the invention to provide mechanism for realigning tapered bunches rolled to an angle with respect to the axis of the machine after their discharge from the bunch rolling device, and correctly locate them for further bunch manipulation without any contact between the locating means and the bunch.

It is an additional object of the invention to provide mechanism for locating bunches after their transfer from a bunch rolling mechanism and prior to their positioning in bunch crimping jaws without engaging the bunch itself during the locating operations.

It is an added object to provide means for locating bunches to be rerolled in the bunch transfer in order that these bunches may be properly positioned in the machine for rerolling.

With these and other objects not specifically mentioned in view, the invention consists in certain combinations and constructions which will be hereinafter fully described, and then specifically set forth in the claims hereunto appended.

In the accompanying drawings which form a part of this specification, and in which like characters of reference indicate the same or like parts:

Fig. 2 is a partial side elevation of the bunch making machine with its feeding mechanism and its driving members;

Fig. 3 is a plan view with parts omitted of an improved transfer unit;

Figure 3a is a plan view of my mechanism used for locating bunches to be rewrapped;

Fig. 4 is a side elevation of the same with parts omitted;

Fig. 5 is a detail view illustrating a bunch lodged in the transfer unit, adjacent the rolling table;

Fig. 6 is a partial side elevation of the crimper transfer with jaws open;

Fig. 7 is a front elevation of the structure shown in Figure 6; and

Fig. 8 is a partial side elevation of the transfer of Figure 6 in position to deliver a bunch into the crimping jaws.

Figure 1:
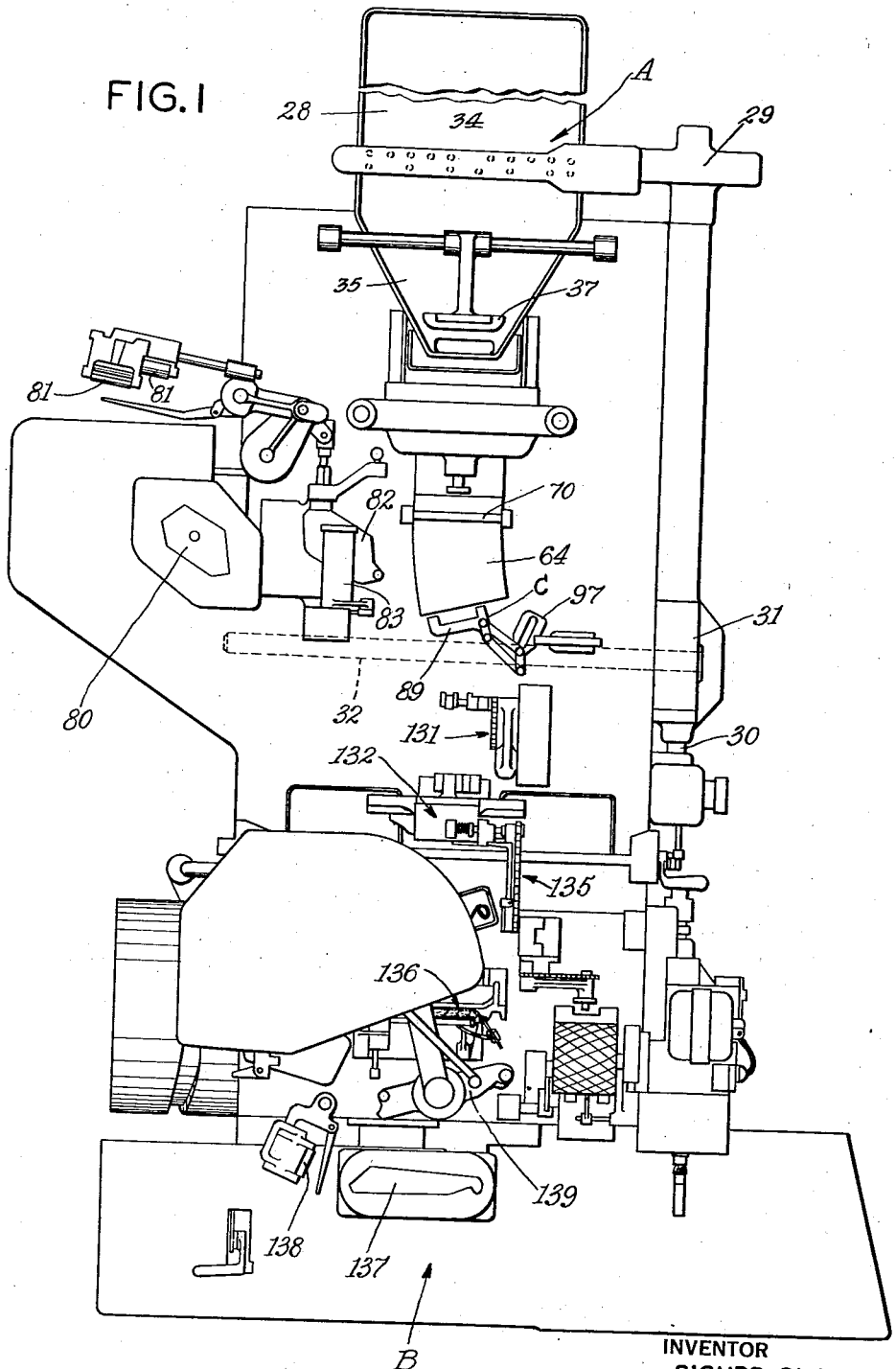
Fig. 1 is a schematic plan view of my improved short filler cigar machine.

Referring to the drawings, which show an approved embodiment of my invention, Fig. 1 discloses in plan the general organization of my improved short filler cigar making machine, and indicated thereon at A is a short filler feeding and bunch making device having associated therewith a binder cutting die and transfer means for forwarding cut binders to the bunch rolling apron, as will be described more fully hereinafter. The bunch making mechanism A may be of the same general type disclosed in pending application, Serial No. 193,244, filed by James P. Durning, March 1, 1938, for Feed for cigar bunch machines. The bunch making mechanism is arranged for cooperation with a wrapper applying unit designated B of a construction well-known in the art. The machine shown in Fig. 1 is characterized by the elimination of the locator and softener unit formerly used in conjunction with wrapper applying units of this type, and by the substitution of short filler bunch forming mechanism for the filler feeding and measuring parts formerly used in conjunction with the unit B for making long filler cigars.

According to my invention, a number of driving parts of the short filler bunch forming mechanism are eliminated and the drive of the wrapper applying unit is utilized for all driving purposes.

The short filler bunch forming mechanism of my machine consists of a base 10 supported at its ends by a pair of brackets 11 and 12 (Fig. 2), the former being secured to a tie frame 13 of the side frames 14 and 15 of the machine, while brackets 12 are attached to a bed plate 16 suitably supported by the frames 14 and 15. A lower tie frame 17 provides means for supporting a bracket 18 to which is secured a motor 19. Motor shaft 20 carries a pulley 21 driving a belt 22 imparting motion to a pulley 23 mounted on a shaft 24 protruding from a housing 25. A variable speed drive of any suitable conventional design (not shown) enclosed in housing 25, imparts oscillating motion to the rakes 26 and 27, confined within the side walls of the hopper 28, in a manner similar to that disclosed in the above mentioned patent application.

The motor shaft 20, through a conventional clutch indicated generally at D (Figure 2) drives conventional reduction gears supported and enclosed in a housing 29 (Figs. 1 and 2) attached to side frame 15. The driving means, enclosed in housing 29, imparts motion to a shaft 30 (Fig. 1) mounted at right angles to motor 20, supported in a housing 31 equipped with suitable gearing of a type similar to that shown in the above mentioned Durning application which drives the cam shaft 32 (Figs. 1 and 2).

The short filler tobacco is deposited in the hopper 28 which, whenever tobacco is to be fed, is vibrated by means of a magnet 155 and armature unit 156 (Figure 2), of a type similar to that described in the aforementioned Durning application, wherein the vibratory hopper is mounted upon wherein the vibratory hopper is mounted upon springs 150 secured to a vibrator base 151, which base also carries lugs 152 supporting studs 153 mounting a magnet supporting bracket 154, upon which the magnet 155 is positioned to cooperate with armature 156 supported by the bottom of the hopper 28 as shown in Figure 2. The bottom web of hopper 28 is provided with a step 33 which in conjunction with oscillating rakes 26 and 27 divide it into a storage chamber 34 for the tobacco, the hopper side walls converging and forming a narrow channel or feed trough 35 which feeds a thin uniform layer or stream of tobacco to the scale pan 36. The thin layer of tobacco forwarded by the vibrating feed trough of the hopper continues to pour into the scale pan 36 until the desired weight of tobacco accumulated therein trips it and discharges the tobacco therefrom. The tripping of scale pan 36 causes a switch 158 fixed to scale shaft 157 which is part of an electric circuit to the vibrator magnet, to break the magnet circuit, stop the vibration of hopper 28, and consequently the flow of tobacco to the scale pan. A tobacco flow control plate 37 swings downwardly and closes the mouth of feed trough 35 when the vibration of hopper 28 ceases, and thereby prevents an excess of tobacco from entering the scale pan. Since the plate 37 is operated in the same manner as described in the aforementioned application, a more detailed showing or description of the same is deemed unnecessary.

With the scale pan tripped, the measured quantity of tobacco is ready to be distributed into a magazine 38 by means of vertically mounted stationary side guide plates 39, a movable magazine gate 40, and an oscillating end guide plate 41 mounted on the hopper mechanism, which move in synchronism. The gate 40 when in its "down" or closed position serves as a cover for the magazine 38 and, when the magazine is ready to receive a charge the gate is swung upward to its "up" or open position as shown in Fig. 2. In approaching this position, the upper end of the gate engages a clip 421 fixed on scale pan 36, and swings the same from its stationary back wall 43, thereby permitting the tobacco to slide from the scale into the funnel formed by members 39, 40 and 41 which directs the charge into magazine 38. A reciprocating plunger 42 subsequently presses the charge into a waiting charge transfer (not shown) which may be of the type shown in Fig. 8 of the heretofore mentioned application.

The plunger 42 is equipped with a rod 43 connected to a lever 44 actuated by a cam 45, on shaft 32, which imparts to and fro motion to the plunger. The lower end of lever 44 terminates in an arm 46 providing means for carrying studs 47 and 48 which pivotally support links 49 and 50 respectively. Link 49 connects to the upper end of an arm 51 fast on a stud 52 which also carries the loosely mounted link 50. An arm 53 fast on stud 52 carries one end of a link 54 connected to a bell crank lever 55 pivoted on a shaft 56 supported by the side frames of the machine. Lever 55 is equipped with a cam roller 57 engaging in a track (not shown) of cam 45.

An adjustable trip stud 58, commonly used in conjunction with lever 44, is provided for the purpose of tripping or operating a lever 59 of the feed control mechanism, this feature being essential for governing the operation of the magazine gate 40 which consequently controls the number of charges transferred from the scale pan. The control mechanism is actuated by a cam 60 on shaft 32, which engages a cam roller 61 provided on a lever 62 pivoted on a shaft 63 journaled in bearings of the side frames of the machine. Since the remainder of the mechanism is of the same construction and operates in the same manner as disclosed in the above mentioned application, a more detailed description of the same is not thought necessary.

The forward stroke of plunger 42 advances the column of tobacco stored in magazine 38 and pushes its forward end into a transfer pocket which, after the charge is severed from the remaining column of tobacco in the magazine by a knife (not shown), transfers the charge into a loop of the rolling apron 64. The above mentioned knife and its coacting parts, which are of the same construction as disclosed in the previously mentioned application, derive motion from a cam 65, on shaft 32, which engages a cam roller 66 carried by a bell crank lever 67 loosely mounted on shaft 63.

When the tobacco charge has been deposited in the loop of the rolling apron 64, a horizontally mounted rolling pin 70 rolls its charge into a binder C (Fig. 2), thus forming a cigar bunch. The apron 64 overlies a conventional rolling table 71 and the rolling pin 70 is supported and operated in the usual manner well known in the art, its to and fro motion being derived from a cam 72, on shaft 32, engaging a cam roller 73 of a bell crank lever 74 which connects by means of a link 75 to an actuating lever 76 loosely mounted on a shaft 77 supported in bearings of the side frames of the machine.

The operator places a leaf over the die block 80 (Fig. 1) of a construction well known in the art, such for instance as shown in Patent No. 1,543,874 granted June 30, 1925 to R. E. Rundell, and, therefore, a brief description of the same is deemed sufficient. When a binder leaf has been located on the die, the block 80 is lowered slightly below the knives so that a sharp and clean cut will result when cam actuated cutting rollers 81 act upon the leaf. The rollers 81, having fulfilled their work of cutting a binder section from the leaf, return to their starting position, and block 20 rises, bringing the cut binder section to a position ready to be engaged by a binder carrier 82 of well known construction. In this latter position, the suction which is supplied to the die block, by well known means, is cut off so that the suction applied to the binder carrier can lift the binder section from the die. The carrier 82, by means of a cam operated arm 83, is swung from the binder receiving station to a position directly above the rolling apron 64, and upon reaching this latter position the suction in carrier 82 is cut off, thereby permitting the suction of the rolling tube 71 and apron 64 to remove the binder from the carrier, which returns to binder receiving position while the charge is rolled about the binder and produces a cigar bunch of desired shape.

The rolled bunch upon reaching the end of the apron 64 is transferred to a carriage or gripper unit designated generally "C" which is provided with two pairs of grippers, comprising jaws 85, 86. The carriage is constrained to move in a substantially horizontal plane from bunch receiving position adjacent the end of the rolling apron, where a rolled bunch is first gripped by the jaws 85, 86, to a discharge position where the bunch is removed from the jaws 85, 86 by a transfer 131 and conveyed to a crimping and trimming device designated generally 132. Transfer 131 (see Figures 6, 7 and 8), may be of the same general type as that shown in Clausen reissue patent, No. 20,441, in which a transfer arm 160 is provided with a shaft 161 mounting a sprocket 162 driven by a chain 163. Gripper finger 166 is loosely mounted on shaft 161 and cooperating therewith is a second gripper finger 165 pivotally mounted on gripper finger 166. A block 164 is fastened to shaft 161. A spring 167 bears against block 164 and an upper portion of finger 165, for yieldable movement of the gripper jaws when delivering a bunch into the crimpers. When the transfer fingers 165, 166 move toward conveyor C to grip and transfer a cigar from the conveyor to the crimper 132, fingers 165, 166 are held apart as shown in Figure 6 ready to be closed upon a cigar bunch in the conveyor C. The fingers are maintained in open position by means of a latch 168 pivotally mounted on a pin 169 and engaging a lock piece 170 fixed to finger 165. At the fixed end of latch 168 is a post 171 to which is connected one end of tension spring 172, the other end of which is fixed to a post 173 carried by finger 165. The gripper opening pin 174 is carried by finger 165 and cooperates with a cam 175 mounted on crimper arm 176 which supports crimping jaw 177. A second crimping jaw 178 fixed to head 179 supported by sliding post 180 coacts with jaw 177 to shape and crimp the bunch transferred thereinto by means of transfer 131.

It will be seen, therefore, that transfer 131 travels between the delivery position of conveyor C and crimper 132. When transfer 131 is moved to pick up newly rolled bunches from conveyor C, fingers 165 and 166 are open, as shown in Figure 6. After the bunch has been laterally displaced and located because of the movement of gripper fingers 85, 86 with the rod 87, rod 133 moves in, engages latch 168, displaces lock piece 170, and spring 172 closes the fingers upon the cigar bunch.

In order to release the cigar bunch from the fingers 165, 166, cam 175 engages pin 174 upon the upward movement of crimper jaw 178 which also engages depending pin 182 carried by arm 183 fixed to the transfer arm 160, whereupon the transfer is lifted simultaneously with the crimper jaws 178, and at the proper time cam 175 forces pin 174 away from it, in a manner similar to that shown in the Clausen patent referred to hereinabove. Latch 168 urged by spring 172 moves into locking position with lock piece 170 and the transfer fingers are then positioned for receiving another cigar bunch.

Referring to Figs. 3, 4 and 5, it will be seen that the grippers each consist of a stationary jaw 85, and a movable jaw 86 mounted on a rod 87 slidable in bearings 88 formed in arm 89. A coiled spring 90 which is furnished for each set of grippers, has one end arrested in jaw 86 while its other end is arrested in a collar 91 fixed to the rod 87. This arrangement is provided in order to maintain a light gripping action against a bunch located in the jaws. When the carriage is positioned to receive a bunch from the rolling apron 64, the jaw 86 rests against adjustable screw 92 mounted in jaw 85 (Fig. 5). In this manner the screw 92 provides means for holding the jaw 86 to best suit the bunch, as each bunch upon entering the grippers must depress the jaw 86 to become seated and held therein.

A stud 93 mounted in arm 89 is loosely supported by one end of an arm 94 projecting from a hub 95 pivoted on a vertical shaft 96 supported by pedestal 97 which is adjustably mounted on bed 16. A stud 98 also fixed in arm 89 loosely supports one end of an arm 99 connected to a stud 100 carried by a lever 101 which is clamped to the upper end of shaft 96. The base of member 95 is provided with a bolt 102 passing through a slot 103 and is threaded into an actuating arm 104 loose on shaft 96. This feature permits adjustment to be made to members 95 and 104 and thereby provides means for changing the position of the gripper unit C which travels from its dotted line or receiving position to the full line or discharge position shown in Fig. 3. The swinging motion imparted to the gripper unit C is derived from a cam 105, mounted on a driven shaft 106, which engages a cam roller 107 of a lever 108 pivoted on a shaft 109. The lower end of the lever is equipped with a ball-pin and socket 110 supporting one end of a rod 111 connecting to a ball-pin and socket 112 engaging a slot 113 of arm 104.

When the bunch is placed in jaws 85, 86, block 115 secured to the end of rod 87 is held against the face of bearing 88 by a spring 116, as shown in dotted lines in Fig. 3. This position is retained while the gripper unit is swung to its discharge position, and until an adjustable screw 117, at the end of a cam actuated rod 118 engages and displaces rod 87 laterally to correctly position the bunch for its subsequent operations. The rod 118 is provided with a yoke 119 adapted to receive a roller 120 attached at the upper end of a cam lever 121, loose on a stud 122 carried by a bracket 123. A guide block 119 provided with an elongated slot 119b is fixed to bracket 123. A cam follower 119a mounted on yoke 119c travels in slot 119b. This mechanism insures the proper positioning of gripper operating rod 133. Lever 121 is provided with a cam follower 124 engaging in a track of cam 125 fixed on a shaft 126 which is driven from shaft 106 by means of bevel gears 127 and 128.

The base of pedestal 97 is provided with an elongated slot 130 which furnishes means for shifting the pedestal and also the gripper unit C to suit different types of rolling tables. In this manner the movements of the gripper unit C by the bunch receiving and bunch discharging positions can be controlled and the desired position of the pedestal insured through lock screw 230. In order to further insure the correct positioning of each bunch at the end of the transfer from the rolling apron 64 to the point of discharge to the bunch transfer 131, the adjusting screw 117 has been provided, which makes it possible to more easily control the lateral movement of rod 87 upon which the gripper jaws 85, 86 are mounted and thereby properly locate each bunch to suit subsequent operations. It will be observed, therefore, that when the carriage C has moved a bunch into the range of operation of the transfer 131, the latter descends, grips a bunch which is held between the gripper jaws 85, 86 and holds it firmly, whereupon screw 117 mounted on rod 118 is withdrawn under the action of cam 125 coacting with lever 121 and rod 87, due to the tension applied thereto by spring 116, moves laterally, until block 115 again engages bearing 88. Rod 87 is held against rotary movement by means of pin 145 mounted on block 115 and slidable in a bore 146 in arm 89. Gripper jaws 85, 86 slide relatively to the bunch which is held in the jaws of the transfer 131 and return to the position they initially occupied when the carriage C first received the bunch from the rolling apron 64. In this manner successive bunches are correctly positioned for transfer to the crimping and trimming device without the application of any external force to the ends of the bunch during its entire transfer from the rolling and gripping device and hence the tobacco in each bunch is undisturbed, thereby contributing much to the uniformity of cigars produced on the machine.

The located bunch is then taken from the gripper jaws 85 and 86, by a conventional transfer unit 131 (Fig. 1) which transfers the bunch to a crimper 132, of a construction well known in the art, in which it is pressed into the desired shape and has its ends trimmed. The crimper 132 may be constructed along the lines of that shown in Clausen reissue patent referred to above, although but a single set of crimping jaws is used. The gripping members of transfer 131 are closed by means of a rod 133 (Fig. 4) suspended from a holder 134 secured to rod 118. At the completion of the crimping operation, a transfer unit 135 (Fig. 1) of the same general type as that shown in Clausen et al., patent, No. 1,740,575, engages the shaped bunch and delivers it to a wrapping device 136 of conventional type such, for instance, as shown in Halstead reissue Patent No. 20,355, in which a wrapper cut on a die block 137 is applied to it and rolled into a cigar.

When a wrapper leaf has been served to the die block 137, it then descends slightly below the knives so that a sharp and clean cut will result when cam actuated cutting rollers 138 act upon the leaf. The rollers 138, having fulfilled their work of cutting a wrapper section from the leaf, then retreat to their former position and block 137 rises, bringing the cut wrapper section to a position ready to be picked up by a wrapper carrier 139 of well known construction which transports the same to the wrapping device 136. Since the up and down movement of the die block 137 and suction control means of the same are well known in the art, a further description of the same is deemed unnecessary.

It often happens that at the end of a day's run there are several cigars which must be re-rolled in order to pass inspection. For handling these bunches in my machine, I have provided a re-rolling gauge 140 mounted on rod 141, adjustably carried by bracket 134 which supports trip rod 133. Rod 141 is furnished with two collars 142 and 143 which limits its movement in the bracket 134. In use, the wing nut 144 is loosened, rod 141 is advanced to the left in Fig. 4, until it abuts against the head end of a bunch correctly positioned in the transfer 131, which transports the bunches from the conveyor 89 to the crimping jaws. Collar 143 is then adjusted to correct position on rod 141, and set by a set screw, and wing nut 144 is tightened to hold rod 141 and gauge 140 in that position for the remainder of the re-rolling operations, whereupon the fingers 165, 166 can close upon the located bunch which has one of its ends in engagement with gauge 140 (Figure 4). In this manner the bunch can be lifted and correctly positioned in crimper 132 for transfer to the wrapping mechanism.

The invention above described may be varied in construction within the scope of the claims, for the particular device, selected to illustrate the invention, is but one of many possible concrete embodiments of the same. The invention is not, therefore, to be restricted to the precise details of the structure shown and described.

What is claimed is:

1. In a cigar machine provided with a rolling table for rolling bunch charges of tobacco in binders to form bunches, a bunch receiving station for said bunches, and a discharge station, a transfer conveyor, including grippers, positioned for movement from said receiving station adjacent said table to said discharge station, a bunch transfer located at said discharge station, and means for moving said conveyor with a bunch held in said grippers in a substantially horizontal plane only for transporting bunches from said receiving to said discharge station for delivery to said transfer.

2. In a cigar machine having a rolling table for rolling bunch charges of tobacco in binders to form bunches, a bunch receiving station positioned to receive bunches, and a discharge station, a transfer conveyor provided with grippers positioned for movement from said receiving station adjacent said table to said discharge station, a bunch transfer located at said discharge station, means for moving said conveyor with a bunch held in said grippers in a substantially horizontal plane only for transporting bunches from said receiving to said discharge station, and means operative after said conveyor has moved to said discharge station for effecting relative lateral movement between said conveyor and said transfer for positioning bunches in said transfer.

3. In a cigar machine having a rolling table for rolling bunch charges of tobacco in binders to form bunches, a transfer conveyor positioned at a receiving station adjacent said table and arranged to convey bunches to a discharge station, said conveyor comprising, an arm, a rod slidably mounted in said arm, and gripper jaws carried by said rod, a bunch transfer located at said discharge station for gripping a bunch held in said jaws, means for moving said conveyor to convey bunches from said table to said transfer, and means operative after said jaws have been positioned at said discharge station for displacing said rod and gripper jaws laterally to locate a bunch held therein axially for delivery to said transfer.

4. In a cigar machine having a curved rolling table for rolling bunch charges of tobacco in binders to form bunches, a transfer conveyor positioned for movement from a receiving station located at an angle with respect to the axis of said machine to a discharge station located at substantial right angles with said axis of said machine, a bunch transfer located at said discharge station, means for moving said conveyor in a substantially horizontal plane only to convey bunches from said table to said transfer, and means for shifting said conveyor during its movement from said receiving station to said discharge station to locate the bunch carried therein at right angles to the axis of said machine and thereby rectify the angular displacement of said bunch in said conveyor due to the curvature of said table.

5. In a cigar machine having means for forming binders and means for delivering said binders to said table, a rolling table for rolling bunch charges of tobacco in binders to form bunches, a conveyor for transporting said bunches from said table to a point of discharge, a transfer for removing bunches from said conveyor, means for locating bunches in said transfer while maintaining the ends of said bunch free from contact with said means, said means comprising a carriage, a rod slidably mounted in said carriage, gripper jaws mounted on said rod and constructed and arranged to hold said bunch against axial displacement therein, and means engaging said rod after said bunch has been moved to said point of discharge to displace said gripper jaws and cigar bunch held therein laterally prior to the operation of said bunch transfer.

6. In a cigar machine provided with a rolling table for rolling bunch charges of tobacco in binders to form bunches, a conveyor for transporting said bunches from said table to a point of discharge, a transfer for removing bunches from said conveyor, means for locating bunches in said transfer, said means comprising, a carriage, a rod slidably mounted in said carriage, bunch gripping jaws mounted on said rod and constructed and arranged to hold said bunch against axial displacement therein, means engaging said rod to displace said jaws and a cigar bunch held therein laterally after said bunch has been moved to said point of discharge and prior to the operation of said bunch transfer, and an adjustable member mounted on said rod engaging means for varying the limits of lateral movement of said rod.

7. In a short filler cigar machine having a bunch rolling table, a transfer conveyor positioned adjacent the discharge end of said table and arranged to receive bunches discharged from said table, bunch crimping and trimming mechanism operating on the ends only of each bunch, a bunch transfer for moving a bunch from said conveyor into said crimping mechanism wherein the bunch ends are shaped and trimmed during a single cycle of the machine operation and the bunch completed for rolling, bunch rolling mechanism, and means for transferring a completely crimped and shaped bunch from said crimping mechanism into said rolling mechanism for application of a wrapper thereto.

8. In a cigar machine, the combination with a hopper containing a supply of short filler tobacco, means for vibrating said hopper to feed a stream of tobacco from said supply, charge forming means, a bunch rolling table, a bunch rolling apron, a transfer device positioned adjacent the discharge end of said table and arranged to receive bunches rolled on said apron, bunch crimping and trimming mechanism operating to complete the formation of a bunch in a single cycle of said machine, a bunch transfer operative to move a bunch from said device into said bunch crimping and trimming mechanism, and means for effecting relative displacement between said device and transfer while holding a bunch firmly against axial movement therein to locate a bunch in said transfer and properly position it in said crimping and trimming mechanism.

9. In a cigar machine, the combination with a vibratory hopper for holding a supply of short filler tobacco, of means for vibrating said hopper to feed tobacco therefrom, means for forming bunch charges from said tobacco, a bunch rolling table, a bunch rolling apron, a transfer device positioned adjacent the discharge end of said table and arranged to receive bunches rolled on said apron, bunch crimping and trimming mechanism operating to complete the formation of a bunch in a single cycle of said machine, a bunch transfer operative to move a bunch from said device into said bunch crimping and trimming mechanism, and means for locating a bunch in said transfer in order to properly position a bunch in said crimping and trimming mechanism.

10. In a cigar machine having a bunch forming device, and a bunch rolling mechanism for rolling bunches in wrappers to form cigars, a conveyor for transferring bunches from said device to said mechanism, said conveyor comprising a support movable in a horizontal plane between said device and mechanism, a slidable carriage mounted in said support, gripper jaws mounted on said carriage for gripping bunches placed therein and holding said bunches gripped against axial movement therein, and means for displacing said carriage laterally to pre-locate a bunch to be manipulated in said mechanism.

11. In a cigar machine having a bunch rolling apron and bunch crimping and trimming means, a transfer mechanism for moving bunches from said apron to said means, including a support, a carriage mounted on said support, a member slidably carried by said support, gripper jaws fixed to said member and arranged to receive a bunch when said carriage is positioned adjacent said apron, means for moving said carriage to a bunch discharging position, a device engaging said member to shift it and thereby displace a bunch held in said gripper jaws axially, a transfer arranged to remove a bunch from said jaws, and means for returning said jaws to bunch receiving position.

12. In a cigar machine having a rolling table for rolling bunch charges of tobacco in binders to form bunches, a conveyor for transporting said bunches from said table to a point of discharge, a transfer for removing bunches from said conveyor, means for locating bunches in said transfer while maintaining the ends of said bunch free of engagement with said means, said means comprising, a carriage, a rod slidably mounted in said carriage, gripper jaws mounted on said rod, means engaging said rod to displace said gripper jaws and a cigar bunch held therein laterally prior to the operation of said bunch transfer, and an element for operating said bunch transfer to grasp a bunch located in said jaws.

13. In a cigar machine having a bunch rolling device and a bunch wrapping mechanism, a transfer conveyor for moving bunches from said device for delivery to said mechanism, said conveyor comprising, a carriage, a support movably mounted in said carriage, bunch holding jaws fixed to said support, means for moving said carriage to and from said rolling device, a member arranged to engage said support and displace it laterally at the discharge position of said carriage, a bracket mounted on said member, and a locating element adjustably mounted in said bracket for positioning bunches in said jaws.

14. In a cigar machine having a bunch rolling mechanism, a single device for shaping and cutting said bunches to size once each cycle of said machine, means for transferring a bunch from said mechanism to said device, said means comprising, a carriage, spaced gripper jaws slidably mounted in said carriage, and means coacting with said jaws to axially displace them, and a bunch gripped therein against relative axial displacement in order to deliver a bunch in proper position to said device.

15. In a cigar machine having a rolling table for rolling bunch charges of tobacco in binders to form bunches, a conveyer for transporting said bunches from said table to a point of discharge, including grippers for holding each bunch carried by said conveyor firmly in said grippers against bodily axial movement relative to said grippers, a transfer for removing bunches from said conveyor, and means for repositioning said conveyor at said discharge position to locate each gripper held bunch transferred by said conveyer for proper removal therefrom.

16. In a cigar machine having a bunch rolling device and a bunch wrapping mechanism, a transfer conveyor for moving bunches from said device for delivery to said mechanism, said conveyor comprising, a carriage, a support movably mounted in said carriage, bunch holding jaws fixed to said support, means for moving said carriage to and from said rolling device, a laterally movable member, a bracket mounted on said member, and a locating element adjustably mounted in said bracket for positioning bunches in said jaws.

17. In a cigar machine having a bunch rolling apron and bunch crimping and trimming means, a transfer mechanism for moving bunches from said apron to said means, including a support, a carriage mounted on said support, a member slidably carried by said support, gripper jaws fixed to said member and arranged to receive a bunch when said carriage is positioned adjacent said apron, means for moving said carriage to a bunch discharging position, a device engaging said member to shift it and thereby displace a bunch held in said gripper jaws axially, a transfer arranged to remove a bunch from said jaws, means for returning said jaws to bunch receiving position, and a transfer operating rod mounted on said device.

SIGURD CLAUSEN.

CERTIFICATE OF CORRECTION.

Patent No. 2,298,279. October 13, 1942.

SIGURD CLAUSEN.

It is hereby certified that error appears in the printed specification of the above numbered patent requiring correction as follows: Page 5, second column, lines 28, 29 and 30, claim 5, strike out "means for forming binders and means for delivering said binders to said table," and insert the same after the word and comma "bunches," in line 31, same claim; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.